March 8, 1966     B. LEVENETZ     3,239,092

PRESSURE VESSEL

Filed June 4, 1964

BORIS LEVENETZ
INVENTOR.

BY Lyon & Lyon
ATTORNEYS

United States Patent Office 3,239,092
Patented Mar. 8, 1966

3,239,092
PRESSURE VESSEL
Boris Levenetz, San Diego, Calif., assignor to Whittaker Corporation, Los Angeles, Calif., a corporation of California
Filed June 4, 1964, Ser. No. 372,495
7 Claims. (Cl. 220—3)

This invention relates to a vessel for storing fluids under pressure and more particularly relates to such a vessel for storing cryogenic fluids and a method for making the same.

Filament wound vessels or containers, especially very large ones, have been found in many instances to be superior to those constructed of metal with respect to strength to weight ratio, cost, and fabrication time. One area where such filament wound vessels would be very useful is in the storage of cryogenic fluids. Vessels designed for this purpose must meet several demanding design criteria, among them being strength sufficient to withstand the internal pressure and impermeability to the cryogenic fluid under pressure during the storage period. These two demands can be met by the use of different composite materials. This solution, however, introduces the further problem of providing shrinkage and strain compatibility of the composite materials at any temperature between $+165°$ F. and $-423°$ F. This problem is compounded by applied pressure cycling.

It is therefore an object of the present invention to provide a filament wound pressure vessel that is impermeable to the fluid contained therein and able to withstand severe temperature and pressure cycling.

It is also an object of the present invention to provide such a vessel incorporating materials having different shrinkage and strain characteristics but constructed so as to reduce the forces created thereby to an acceptable value.

It is another object of the present invention to provide a method for constructing such a vessel.

These and other objects and advantages of the present invention will become more apparent upon reference to the accompanying description and drawings in which.

Figure 1:
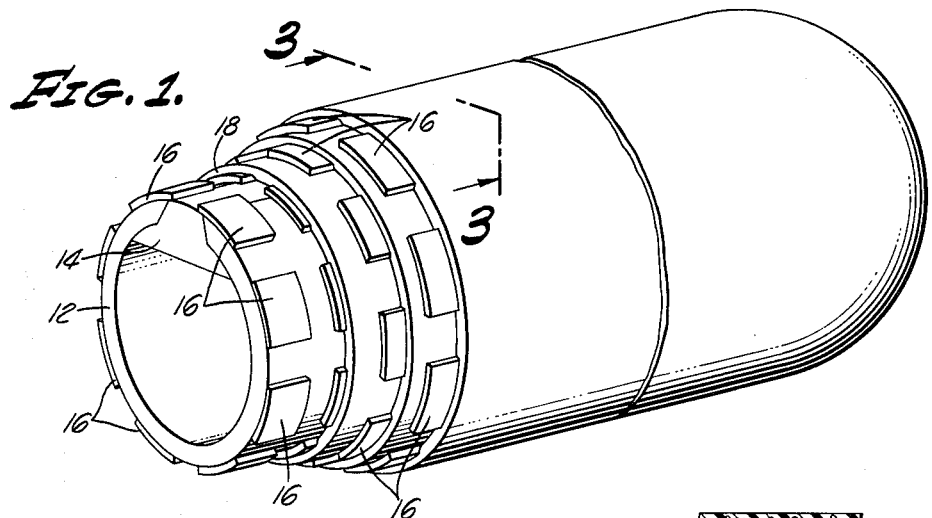
FIGURE 1 is a perspective view, partly broken away, of a vessel constructed in accordance with the present invention.
Figure 2:
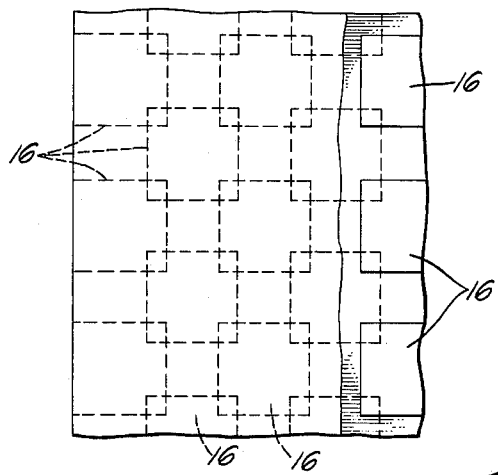
FIGURE 2 is a fragmentary plan view, partly broken away, of the vessel of FIGURE 1.
Figure 5:
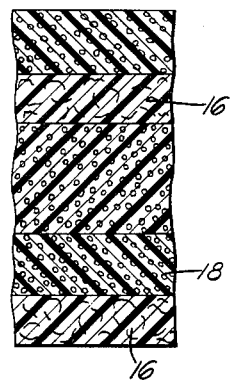
FIGURE 5 is an enlarged sectional detail of the structure of the present invention.
Figure 3:
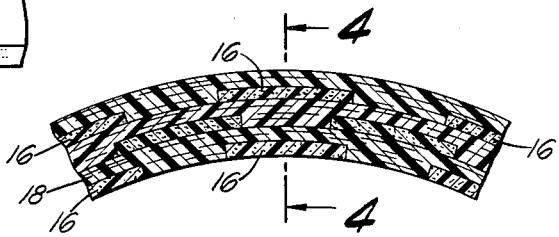
FIGURE 3 is a cross sectional view taken along lines 3—3 of FIGURE 1.
Figure 4:
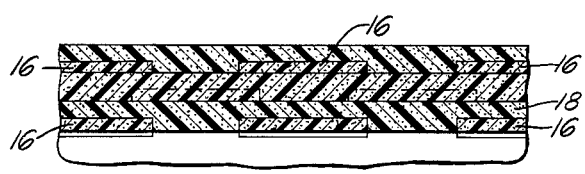
FIGURE 4 is a cross sectional view taken along lines 4—4 of FIGURE 3.

The structure of the pressure vessel of the present invention is based on the principle that dividing the impermeable or liner material into small pieces or segments will reduce the strain difference between liner and shell material. This will eliminate liner or shell failure caused by shrink forces which are present at low temperatures, or by pressure cycling at the usually high strain level of the shell structure. The segments of liner material are sandwiched between layers of shell material, which layers are filament wound, the individual segments of successive layers of liner material being displaced from the segments of the preceding layer to provide complete overlapping and adequate impermeability.

Referring now to the drawing, a movable mandrel 12, for example of the type having a removable wedge portion 14 has positioned thereon a plurality of pieces or shingles 16 of a suitable impermeable liner material. These shingles 16 are temporarily bonded to the mandrel by any suitable adhesive and may be made of any material suitable for the purpose. For example, they could be plastic films such as polytetrafluoroethylene, commonly sold by the trade name "Teflon," polyethyleneterephthalate, commonly sold by the trade name "Mylar," or a co-polymer of polyvinylidene chloride and polyvinyl chloride such as that commonly sold by the trade name "Seran," or the liner element could be a metal foil such as aluminum. They could also be plastic films coated with a microscopic layer of deposited metal such as a polyethyleneterephthalate film with deposited chromium or aluminum.

After the shingles 16 have been properly positioned, a first ply or layer 18 of the shell material is filament wound on the shingle covered mandrel surface by any conventional method. The structural or shell material consists of filamentary reinforcement and a matrix. The reinforcements may be glass, nylon, fortisan, thin metal wire or an oxide fiber, such as boron. The matrix may be a polymeric resin such as epoxy, polyurethane, polyamide, nylon-epoxy or a combination of these.

A second layer or pattern of liner segments or shingles 16 are then positioned over the filament wound layer, the individual shingles being displaced from and overlapping the individual shingles of the preceding layer. A second filament layer or ply is then wound over these shingles. This process is continued until the necessary wall thickness is built up and the overlapping shingles completely cover the whole area and form a complete impermeable surface. It should be understood that the drawings are illustrative only and do not attempt to portray the actual relative dimensions of the various components. It should also be understood that ordinarily a great many more layers than those shown would be used.

The whole assembly is then cured as required for the particular resin system and the shell or structural layers bonded with the liner segments or shingles form an integral structure. The mandrel is then removed in a conventional manner, as shown by removing the wedge 14 and collapsing the mandrel portion 12. If desired, the sequence of the first two steps can be reversed, that is, the mandrel can first be wound with a filament layer and a layer of shingles then positioned on this layer rather than vice versa. The tank or vessel can now be used for storage of cryogenic fluids without the danger of the different strain and shrinkage characteristics of the liner and shell materials creating sufficient stresses to damage the vessel.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A vessel for storing fluids under pressure comprising a plurality of segments of a material substantially impermeable to said fluid and a plurality of layers of filament wound structural material, said segments being arranged in patterns each pattern having segments in both the longitudinal and transverse directions and sandwiched between layers of said structural material, individual segments of each pattern being spaced from the other segments of the pattern and overlapping segments of the preceding pattern.

2. A vessel for storing fluids under pressure comprising a plurality of segments of a material substantially impermeable to said fluid and a plurality of layers of filament wound structural material, said segments being arranged in patterns, each pattern having segments in both the longitudinal and transverse directions and sandwiched between layers of said structural material, the segments of each pattern being spaced from the other segments of the pattern, said patterns being offset so that the individual segments of each pattern overlap segments of the preceding pattern to form a complete impermeable surface, said patterns and said layers being bonded together to form an integral structure.

3. A vessel for storing fluids under pressure comprising a plurality of segments of a material substantially impermeable to said fluid arranged in a longitudinal and transverse pattern, none of the segments of the pattern being in engagement with other segments of the pattern, a layer of filament reinforced resin material wound about said pattern, a second pattern of said segments arranged on said layer, said second pattern being offset from said first pattern so that the segments thereof overlap the segments of said first pattern, a second layer of filament reinforced resin material wound about said second pattern, a plurality of alternating patterns and layers positioned over said second layer, each of said patterns being offset from the preceding pattern to form a complete impermeable surface, said resin material being cured to form an integral structure.

4. A method of forming a vessel suitable for storing fluids under pressure comprising arranging a plurality of segments of a material substantially impermeable to said fluid in both the longitudinal and transverse directions to form a pattern, each segment being spaced from the other segments of the pattern, winding a layer of filamentary material over said pattern, arranging a second plurality of said segments in a second pattern on said layer, the segments of said second pattern being displaced from the segments of the first pattern, winding a second layer of filamentary material over said second pattern, and continuing to alternate said patterns and said layers with each of said patterns being offset from the preceding pattern until a complete impermeable surface is formed.

5. The method of claim 4 wherein said filamentary material is a filament reinforced resin material and wherein said resin material is cured after said surface is built up to form an integral structure.

6. The method of claim 5 wherein said first pattern is arranged on a mandrel, said mandrel being removed after said structure is cured.

7. The method of claim 5 wherein said first pattern is arranged on a layer of filamentary material wound on a mandrel, said mandrel being removed after said structure is cured.

References Cited by the Examiner

UNITED STATES PATENTS

| 2,253,093 | 8/1941 | Reichle et al. | 220—3 |
| 2,594,693 | 4/1952 | Smith. | |
| 3,047,191 | 7/1962 | Young | 220—83 |
| 3,115,271 | 12/1963 | Anderson et al. | 220—83 |
| 3,137,405 | 6/1964 | Gorcey | 220—63 |

THERON E. CONDON, *Primary Examiner.*

R. H. SCHWARTZ, *Assistant Examiner.*